(12) United States Patent
Sardo

(10) Patent No.: US 6,267,222 B1
(45) Date of Patent: Jul. 31, 2001

(54) VISUAL INSPECTION STATION FOR FRUIT

(75) Inventor: Alberto Sardo, Chateau Renard (FR)

(73) Assignee: Xeda International, Saint-Andiol (FR)

( * ) Notice: Subject to any disclaimer, the term of this patent is extended or adjusted under 35 U.S.C. 154(b) by 0 days.

(21) Appl. No.: 09/417,306

(22) Filed: Oct. 13, 1999

(30) Foreign Application Priority Data

Oct. 14, 1998 (FR) .................................................. 98 12883

(51) Int. Cl.[7] .................................................. B65G 17/32
(52) U.S. Cl. ........................ 198/377.02; 198/404
(58) Field of Search ............................... 198/404, 377.02, 198/377, 474.1, 363.2

(56) References Cited

U.S. PATENT DOCUMENTS 5,690,125 * 11/1997 Niemann et al. ............... 198/377.02

* cited by examiner

Primary Examiner—Kenneth W. Noland
(74) Attorney, Agent, or Firm—Wenderoth, Lind & Ponack, L.L.P.

(57) ABSTRACT

The visual inspection station (14) for articles, such as fruit, comprises transport means (18) for the articles and at least one viewing post (90, 92) arranged on the transport path of the articles. According to the invention, it comprises two viewing posts (90, 92) arranged successively on the transport path of the articles, each post being designed for the inspection of an exposed face of the articles resting on the transport means (18). Turning means (24) for the articles are arranged between the two viewing stations (90, 92).

16 Claims, 4 Drawing Sheets

VISUAL INSPECTION STATION FOR FRUIT

BACKGROUND OF THE INVENTION

The present invention relates to a visual inspection station for articles such as fruit, of the type comprising transport means designed to support the articles during their transport, and at least one viewing post provided on the transport path of the articles for inspection of an exposed face of the articles resting on the transport means.

Current fruit classification installations generally include, in addition to means for weighing the fruit, a visual inspection station for the fruit making it possible to ascertain, for each fruit, its shape, its color and any surface defects.

For effective classification of fruit, each fruit has to be visually examined from a plurality of directions, so that the great majority of the surface of the fruit is inspected. In particular, it is appropriate for the viewing post to be able to provide access to the face of the fruit resting on the transport means.

In order to inspect the resting face, it is known to arrange, below the transport means, a camera whose field of view is directed upwards and passes through the transport means. To this end, these means comprise a see-through conveyor, comprising, for example, fine transverse strands on which the fruit rest.

The need to provide a see-through conveyor for the transport of the fruit increases the complexity of the transport means, the more so since the latter must guarantee constant spacing between the fruit, depending on the length of the conveyor.

SUMMARY OF THE INVENTION

The object of the invention is to provide a visual inspection station for articles moving on transport means which does not require transport means provided with see-through support surfaces, in order to permit inspection of the face by which the articles rest on the transport means.

To this end, the invention relates to a visual inspection station for articles such as fruit, of the type comprising transport means designed to support the articles during their transport, and at least one viewing post arranged on the transport path of the articles for inspection of an exposed face of the articles resting on the transport means. The visual inspection station comprises two viewing posts arranged successively on the transport path of the articles, each viewing post being designed for the inspection of an exposed face of the articles resting on the transport means, and turning means for the articles arranged between the two viewing posts, which turning means are designed to place each article on the transport means before it passes in front of the second viewing post, substantially on the exposed face of the article during its passage into the first viewing post, and so expose, opposite the second viewing post, the face of the article in contact with the transport means during its passage into the first viewing post.

According to particular embodiments, the station comprises one or more of the following features:

- the transport means comprises two successive conveyors, each circulating in front of a viewing post, between which are arranged the turning means for the articles, which turning means are designed to undertake transfer of the articles from the first conveyor to the second conveyor;
- the turning means comprises two supporting rocker arms, defining between them a holding space for an article in which the article is retained substantially motionless relative to the two support arms, the two support arms being displaceable substantially simultaneously between a position for removing the article from the transport means and a position for placing the turned article on the transport means;
- the two support arms are each articulated on a conveyor and the station comprises, in an article transfer and turning region, actuating means for the support arms;
- the actuating means for the support arms comprises fixed cam surfaces, relative to which the conveyors are displaceable, which cam surfaces are designed to interact with the support arms during the advance of the conveyors to cause the rocking of the arms;
- in the transfer and turning region, the two conveyors are adjacent and move parallel to one another at equal speeds; and
- the conveyor, positioned upstream of the turning means, comprises means for distributing the articles in positions spaced at a distance determined in accordance with its length, and the conveyor, positioned downstream of the turning means, comprises support zones for the articles which are spaced at an interval determined in accordance with its length, the turning means being designed to transfer each article from a position on the first conveyor to a support zone of the second conveyor.

BRIEF DESCRIPTION OF THE DRAWINGS

The invention will be better understood from a reading of the description which follows and is given solely by way of example and with reference to the drawings, in which.

DETAILED DESCRIPTION OF THE INVENTION

Figure 1:
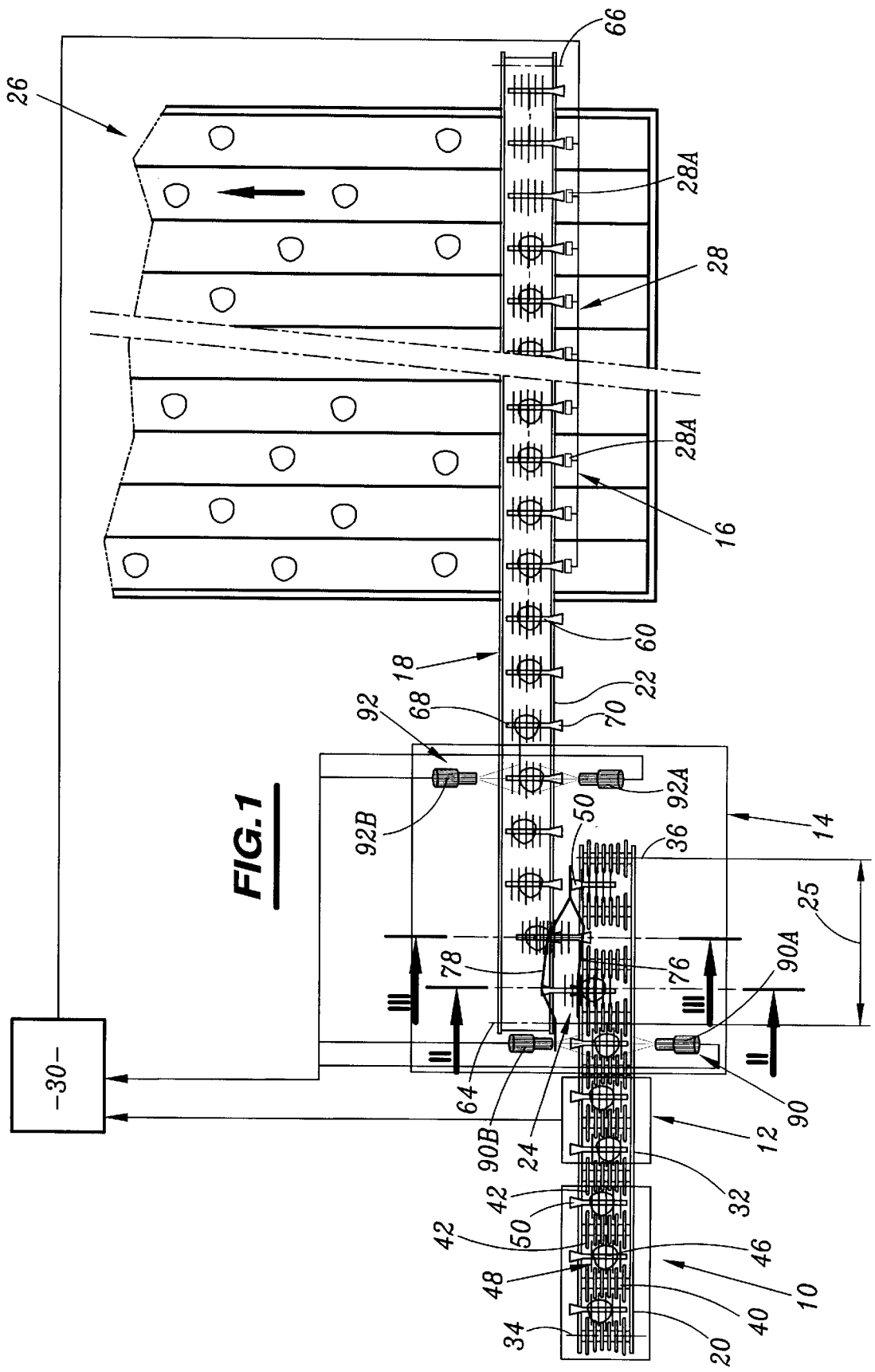
FIG. 1 is a plan view of a visual inspection station for articles, according to the invention.

The installation shown in the figures is an installation intended for the classification of articles such as fruit received in bulk. It is intended to distribute the articles into separate channels as a function of predetermined criteria relating to the articles such as their weight, color and appearance.

The installation essentially comprises a loading station 10, a weighing station 12, a visual inspection station 14 and an ejection zone or station 16. Transport means 18 undertake the conveyance of the products from the loading station 10 to the ejection station 16.

The transport means 18 comprise, in succession, a first conveyor 20 and a second conveyor 22, together with means 24 for transferring the articles from the first conveyor to the second conveyor within the visual inspection station 14. In the station 14, the two conveyors 20, 22 extend parallel to one another over a common transfer section 25. The means 24 is also designed to turn the articles during their transfer from the first conveyor 20 to the second conveyor 22.

The loading station 10 is arranged at the inlet to the first conveyor 20. The loading station 10 is designed to receive articles in bulk and distribute them uniformly over the length of the conveyor 20, as will be explained in the further course of the description. The loading station 10 comprises a duct converging in the form of a funnel designed to bring the articles onto the conveyor in bulk.

The weighing station 12 is arranged on the conveyor 20 downstream of the loading station 10. At the outlet from the weighing station, the first conveyor 20 moves into the visual inspection station 14.

At the outlet from the visual inspection station 14, the second conveyor 22 enters the ejection station 16. It passes transversely over a set of parallel channels 26 filled with water. These channels are, for example, 40 in number and each a meter wide.

Release means 28 are arranged along the second conveyor 22. They are designed to cause the ejection of the articles into the selected one of the channels 26 as a function of criteria relating to the type of articles. The release means 28 comprise, along the conveyor 22, release elements 28A each associated with one channel 26.

In order to cause the selective ejection of the articles, the weighing station 12 and the visual inspection station 14 are connected to an information processing unit 30 designed to control the release means 28.

Figure 2:
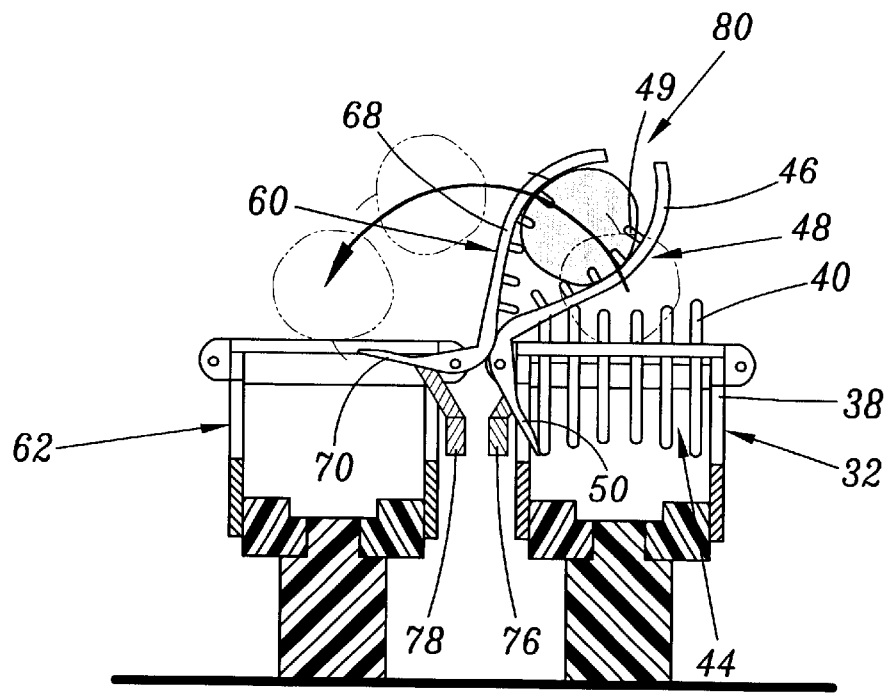
FIGS. 2 and 3 are views in cross section of a transfer zone according to FIG. 1 taken, respectively, along the line II—II and the line III—III.
Figure 3:
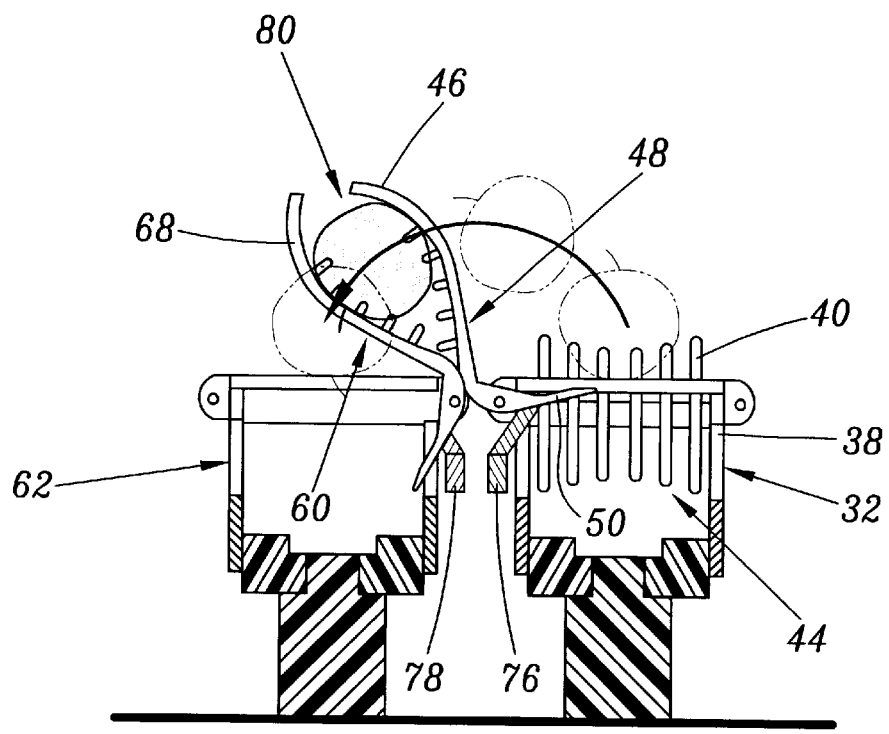

As shown on a larger scale in FIGS. 2 and 3, the first conveyor 20 has a structure designed for the automatic distribution of the articles in accordance with its length, at the time of their loading in the station 10. The articles are thus spaced from one another at a predetermined interval, for example a constant interval, in accordance with the length of the conveyor.

To this end, the first conveyor 20 comprises a drive belt 32 mounted to move between two end wheels 34, 36, one of which is driven to rotate by a motor (not shown). The drive belt 32 is formed of a succession of elements 38 connected together in an articulated manner. It is moveable as a closed loop between the wheels 34, 36.

Rollers 40 are mounted to rotate relative to the drive belt 32 about axles perpendicular to the direction of advance of the conveyor. The rotation axles are carried by the elements 38 forming the drive belt.

The rollers 40 have the general shape of an hourglass, meaning that they are formed by two coaxial frustoconical sections connected at their zone of smallest diameter. Thus, the rollers 40 have a narrow median section and widened ends. They additionally possess five peripheral grooves 44 regularly distributed over their length.

The rollers 40 are distributed uniformly over the entire length of the drive belt 32. They define between them equidistant seatings 42 in the form of cells intended to receive a single article released by the loading station 10.

The bottom of each cell 42 is defined by a first arm 46 of a support lever 48 for the articles. The arm 46 forms a support arm for the article received in the corresponding cell. One lever is provided for each cell 42. Each lever 48 is articulated about an axis extending in the direction of advance of the conveyor on an element 38 of the drive chain.

The support arm 46 is provided laterally, on each side, with fingers 49 for holding an article. These are, for example, five in number. They are arranged to be received in the peripheral grooves 44 of the adjacent rollers.

The second arm, designated 50, of each support lever 48 forms a control arm. It extends laterally downward along the conveyor 20 when the lever 48 is in its article transport position, in order words when the support arm 46 extends substantially horizontally.

The levers 48 are all articulated on the lateral edge of the first conveyor which is directed toward the second conveyor.

The second conveyor 22 is substantially analogous to the first conveyor 20. However, the second conveyor 22 is advantageously lacking in rollers 40 between the support levers designated 60. The latter are articulated, as in the first conveyor, on the lateral edge of a drive belt 62 mounted to move between two rollers 64, 66. The levers 60 are articulated on the edge of the drive belt 62 which faces the first conveyor 20 on the transfer section 25.

The levers 60 are distributed over the length of the conveyor, being spaced at a constant interval equal to that separating the levers 48 of the first conveyor. The two conveyors have their movement speeds synchronized so that the levers 48 and 60 are displaced side by side over the transfer section 25.

The levers 60 comprise, like the levers 48, a support arm 68 for the articles, provided laterally on each side of the article-holding fingers. The levers 60 additionally each comprise a second arm 70 forming a control arm. The latter extends laterally downward along the drive belt 62 when the support lever is in its article transport position.

The transfer and turning means 24 shown in FIGS. 2 and 3 comprises, in addition to the support levers 48 and 60 of the first and second conveyor, actuating means for the associated control arms 50 and 70. These actuating means are designated 76 and 78 respectively. They are each formed by a fixed ramp forming a cam surface. These ramps are arranged laterally between the two conveyors over the length of the transfer section 25. They are designed, respectively, to raise the control arms 50, 70 of the ejection levers during their passage into the transfer section 25.

The ramps have a profile such that, during their displacement over the transfer section 25, the two facing levers rock as follows.

At the input of the transfer section 25, the lever 48 is held in its transport position. The lever 60 is rocked until the support arm 68 is in the immediate vicinity of the upper surface of the article resting on the support arm 46.

While the two support arms 46 and 68 grip the article between them, they are jointly rocked toward the conveyor 22 to undertake the transfer and turning of the article.

In particular, the support arm 46 is gradually raised, while the support arm 68 is simultaneously brought toward the drive belt 62.

Thus, as shown in FIGS. 2 and 3, during the transfer of the article, the support arms of the two adjacent levers define an article holding space 80 during the transfer of the article from the first to the second conveyor.

In the space 80, the article is confined and, in particular, substantially totally immobilized for rotation relative to the support arms 46 and 68.

During the rocking of the levers, the transferred article is turned as shown in FIG. 3.

The rocking of the levers continues until the lever 60 regains its transport position on the drive belt 62. In this position, the article rests on the support arm 68, being supported on that face which was initially its upper face when the article was resting on the lever 48.

After the lever 60 has regained its transport position, the lever 48 is brought back into the transport position on the drive belt 32. The upper face of the article resting on the lever 60 is then the face on which the article rested on the lever 48.

In the station 14, on either side of the transfer and turning means 24, a first viewing post 90 and a second viewing post 92 are arranged, respectively, on the first conveyor 20 and the second conveyor 22. These viewing posts are designed, respectively, to capture at least a digital image of the exposed region of the article moving over the first and second conveyors.

Each viewing post 90, 92 comprises, for example, two cameras designated 90A, 90B and 92A, 92B, respectively. The latter are arranged in the upper part of the associated conveyor 20, 22, on either side thereof. They are offset angularly relative to the vertical and their field of view is directed downward toward the conveyor.

The cameras are connected to the central information processing unit 30.

The installation described here functions as follows.

The fruit is introduced in bulk into the loading station 10. It is then poured onto the distribution section of the first conveyor. The fruit coming into contact with the rollers 40 is distributed under the action of its own weight into the cells 42 defined between the rollers, so that each cell is occupied only by a single fruit.

The fruit are then successively weighed in the weighing station 12 and the weight of each fruit is passed to the central information processing unit 30.

After weighing, the fruit enter the visual inspection station 14. During their passage vertically past the viewing post 90, two images of the exposed surface of each fruit are digitized and passed to the central information processing unit 30.

During the passage into the transfer and turning means 24, the fruit, taken from the first conveyor 20, are successively transferred onto the second conveyor 22, during which they are turned.

Thus, the surface on which a fruit rests on the conveyor 20 is exposed when the fruit is resting on the second conveyor 22. In these circumstances, during the passage of the fruit vertically to the viewing post 92, the latter stores two images of the surface of the fruit which were masked during its transport on the first conveyor 20.

These two images are passed to the central information processing unit 30.

For each fruit, the central information processing unit 30 then has four images of the fruit, taken from different angles. Because of the turning of the fruit between the first and second conveyors, the stored images cover virtually the whole surface of the fruit, allowing accurate determination of its external appearance.

The information received by the central information processing unit 30 and relating to the weight of each fruit, its external appearance and its nature, make it possible to determine the channel 26 into which each fruit is to be ejected.

In order to release a fruit into the selected channel, the central information processing unit 30 controls the rocking of the levers 60 when the latter pass above the selected channel. To this end, the release element 28A associated with the selected channel is actuated during the passage of the lever to thrust the control arm 70 and so cause the rocking of the fruit, which falls under the action of its own weight into the corresponding channel filled with water.

In a visual inspection station as described here, the images of each article are all taken from the upper part of the article resting on the conveyor, which avoids the need to provide see-through conveyors.

Furthermore, the turning of the articles between the two successive viewing posts allows virtually the whole surface of the article to be inspected.

As an alternative, the weighing station 12 is arranged not on the first conveyor 20 but on the second conveyor 22 downstream of the visual inspection station 14.

Figure 4:
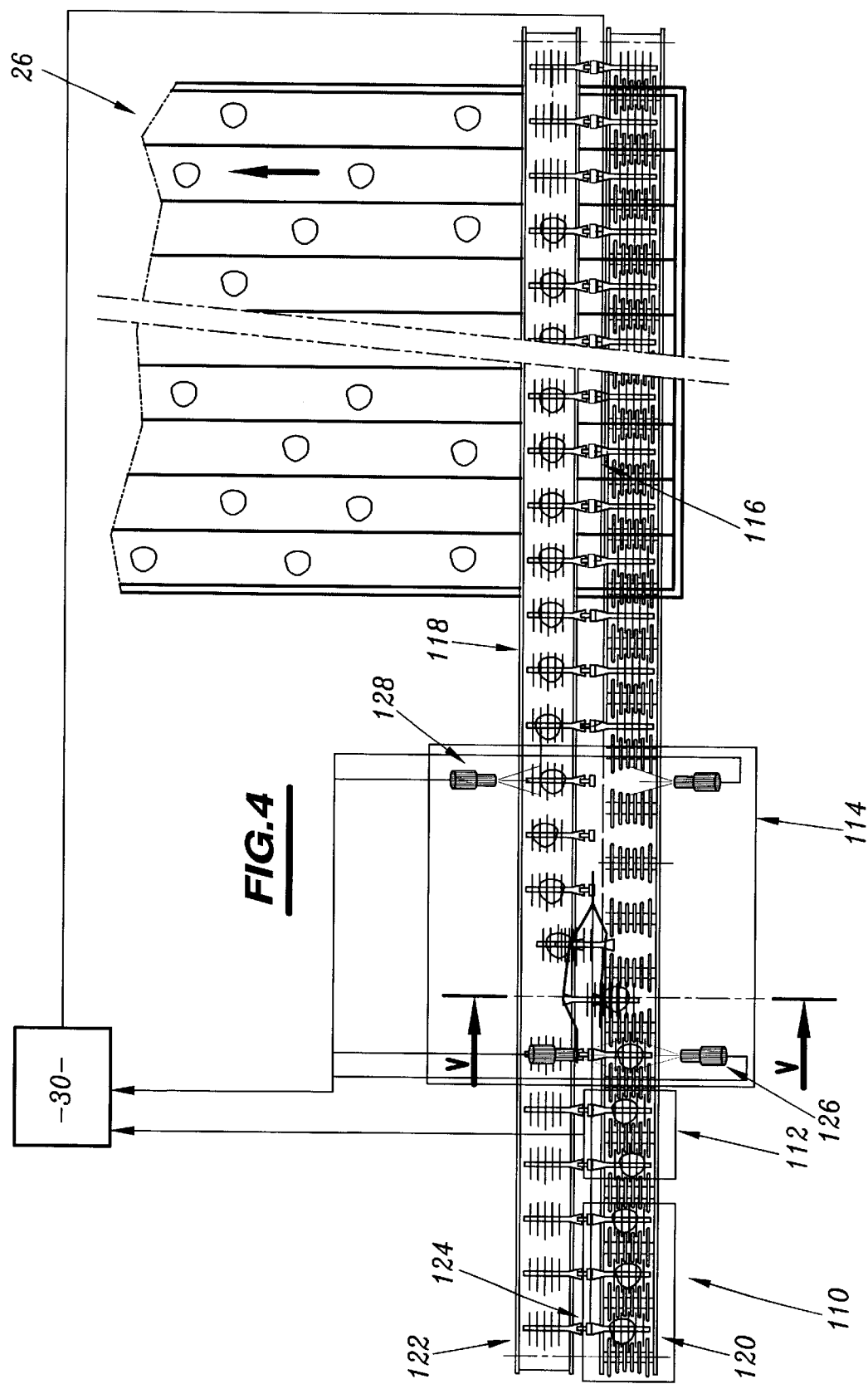
FIG. 4 is a plan view of an alternative embodiment of a visual inspection station for articles, according to the invention.

The article classification installation shown in FIG. 4 likewise comprises a loading station 110, a weighing station 112, a visual inspection station 114 and an ejection zone or station 116.

This station comprises transfer means 118 of a different structure from that used in the embodiment according to FIG. 1. In particular, these transfer means comprises a single conveyor extending from the loading station to the ejection station 116.

This single conveyor comprises first and second lateral transport rows 120, 122 extending parallel to one another and advancing simultaneously in permanent association with a single drive chain. Between these two transport rows 120, 122, the conveyor comprises a central row 124 moving at the same speed as the lateral rows 120 and 122.

The lateral rows 120, 122 and the central row 124 all extend over the length of the installation. In particular, the first row 120 passes through the loading station 110 and the weighing station 112.

The visual inspection station 114 extends over contiguous sections of the first and second rows 120, 122. First and second viewing posts 126, 128 are provided successively on the path of the transport means 118. These viewing posts are installed respectively on the first row 120 and on the second row 122. They are similar in nature to those designated 90, 92 in the embodiment according to FIG. 1.

The second row 122 extends beyond the second viewing post 128 into the ejection station 116.

Figure 5:
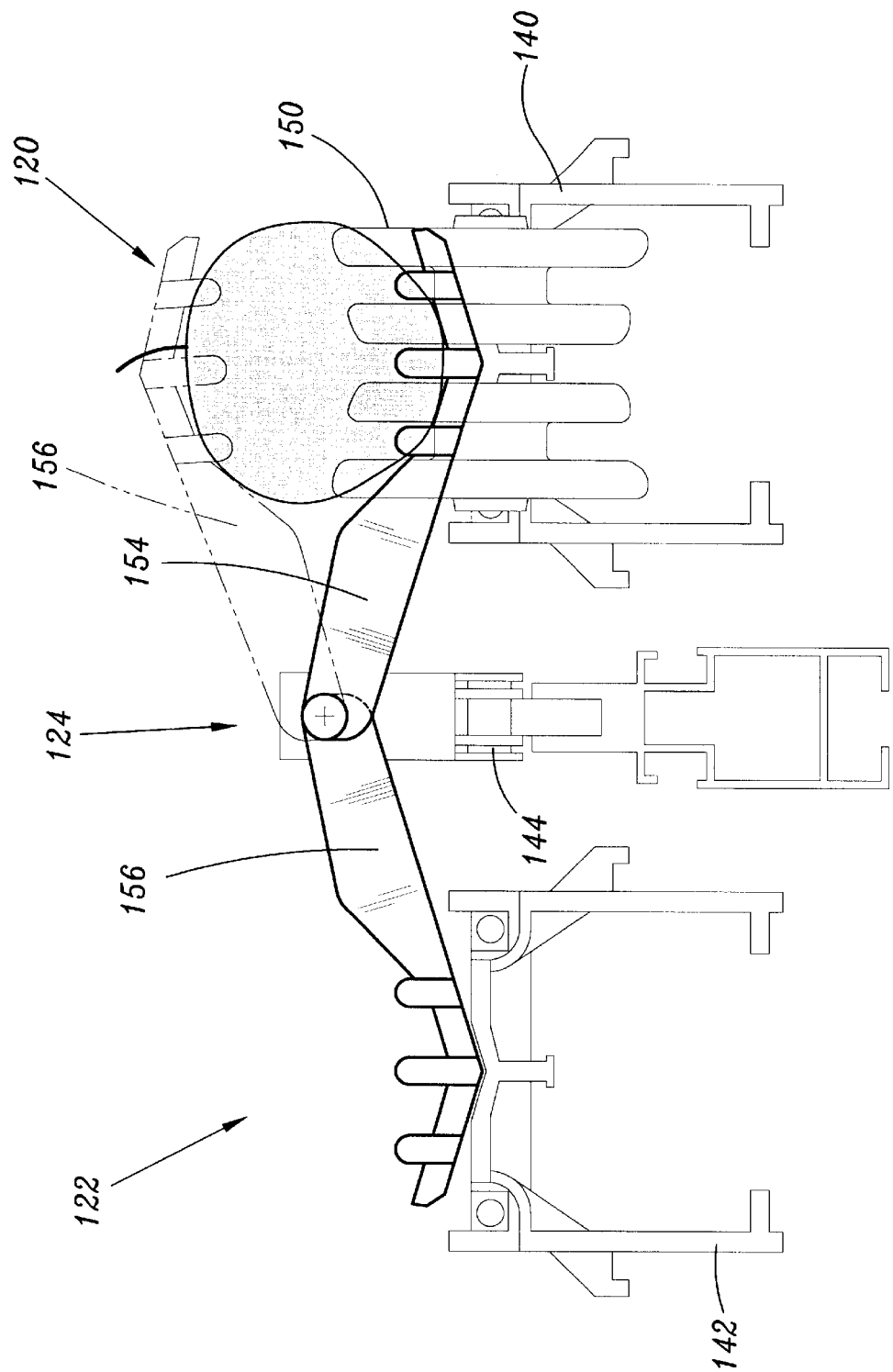
FIG. 5 is a view in cross section of a transfer zone according to FIG. 4.

More specifically, and as shown in FIG. 5, the lateral row 120 consists of a succession of elements 140 connected to each other in an articulated manner. Similarly, the lateral row 122 is likewise formed of a succession of elements 142 connected to each other in an articulated manner. The adjacent elements of the two rows are interconnected transversely to the common closed-loop drive chain, itself driven by a stepping motor unit (not shown).

The central row 124 comprises a succession of elements 144 connected to one another in an articulated manner to form a loop, this loop being permanently associated with the corresponding elements 140 and 142 of the lateral rows.

Arranged between the elements 140 of the first row are rollers 150 mounted to rotate. These rollers are analogous to the rollers 40 of the first embodiment and effect distribution of the articles along the length of the row 120 during their loading into the loading station 110.

First support levers 154 are articulated at one of their ends on the elements 144. These levers are designed to be inserted between two successive rollers 150 of the first row and thus support an article.

Similarly, second levers 156 are likewise articulated on the elements 144 of the central row, following the same axis as the first levers 154. These second levers 156 are designed to bear on the elements 142 of the second row.

Each of the levers 154 and 156 is articulated between its position of rest, bearing on the mobile elements of the row 120 or 122, and a quasi-turned position above the other row, as shown in FIG. 5 in broken lines.

Finally, in a region for the transfer of articles from the first row 120 to the second row 122, provided between the first and second viewing posts 126, 128, means 160 are installed for actuating the levers 154 and 156 in order to effect, as in the previous embodiment, the turning of the articles during transfer of the articles from the first row to the second row. During this transfer, the articles are held between the first and second levers 154 and 156, thus reducing the risk that the articles will slip while being turned.

It can be seen that, in this embodiment, the mobile elements of the first and second rows being moved by the same drive means and over the same path, no problem of synchronization exists. Similarly, the levers 154 and 156 being driven over the entire length of the conveyor while remaining fixed relative to the transport positions of the articles on the first and second rows, the synchronization of the corresponding first and second levers does not need to be provided.

What is claimed is:

1. A visual inspection station (14) for articles such as fruit, comprising:

transport means (18; 118) designed to support the articles during their transport, first and second viewing posts (90, 92; 126, 128) arranged successively on the transport path of the articles, each of said first and second viewing posts being designed for the inspection of an exposed face of the articles resting on the transport means (18; 118);

and turning means (24) for the articles arranged between the first and second viewing posts (90, 92; 126, 128), which turning means (24) is designed to place each article on the transport means (18; 118) before it passes in front of the second viewing post (92; 128), substantially on the exposed face of the article during its passage into the first viewing post (90; 126), and so expose, opposite the second viewing post (92; 128), the face of the article in contact with the transport means (18; 118) during its passage into the first viewing post (90; 126).

2. The station according to claim 1, characterized in that the transport means (18) comprises two successive conveyors (20, 22), each circulating in front of at least one of said first and second viewing posts (90, 92), and between which is arranged the turning means (24) for the articles, which turning means (24) is designed to undertake transfer of the articles from the first conveyor (20) to the second conveyor (22).

3. The station according to claim 1, characterized in that the turning means (24) comprises two supporting rocker arms (48, 60), defining between them a holding space (80) for an article in which the article is retained substantially motionless relative to the two support rocker arms (48, 60), the two supporting rocker arms (48, 60) being displaceable substantially simultaneously between a position for removing the article from the transport means (18) and a position for placing the turned article on the transport means (18).

4. The station according to claim 2, characterized in that the turning means (24) comprise two supporting rocker arms (48, 60), defining between them a holding space (80) for an article in which the article is retained substantially motionless relative to the two supporting rocker arms (48, 60), the two supporting rocker arms (48, 60) being displaceable substantially simultaneously between a position for removing the article from the transport means (18) and a position for placing the turned article on the transport means (18); and characterized in that the two supporting rocker arms (48, 60) are each articulated on one of said conveyor (20, 22) and in that the station comprises, in an article transfer and turning region (25), actuating means (76, 78) for the supporting rocker arms (48, 60).

5. The station according to claim 4, characterized in that the actuating means for the supporting rocker arms (48, 60) comprise fixed cam surfaces (76, 78), relative to which the conveyors (20, 22) are displaceable, which cam surfaces (76, 78) are designed to interact with the supporting rocker arms (48, 60) during the advance of the conveyors (20, 22) to cause rocking of the supporting rocker arms (48, 60).

6. The station according to claim 4, characterized in that, in the transfer and turning region (25), the two conveyors (20, 22) are adjacent and move parallel to one another at equal speeds.

7. The station according to claim 2, characterized in that, upstream of the turning means (24), one of said conveyors comprises means (40) for distributing the articles in positions (45) spaced at a distance determined in accordance with its length, and in that downstream of the turning means (24), the other of said conveyors comprises support zones (68) for the articles which are spaced at a distance determined in accordance with its length, the turning means (24) being designed to transfer each article from a position (45) on said one of said conveyors to a support zone (68) of said other of said conveyors (22).

8. Station according to claim 1, characterized in that the transport means (118) comprises a single conveyor comprising two contiguous article transport rows (120, 122), each row circulating in front of one of said viewing posts (126, 128), and in that the turning means is arranged between the two rows and is designed to undertake transfer of the articles from one row of said rows (120) to the other of said rows (122) of the conveyor.

9. The station according to claim 8, characterized in that the turning means (24) comprises two supporting rocker arms (48, 60), defining between them a holding space (80) for an article in which the article is retained substantially motionless relative to the two supporting rocker arms (48, 60), the two supporting rocker arms (48, 60) being displaceable substantially simultaneously between a position for removing the article from the transport means (18) and a position for placing the turned article on the transport means (18); and characterized in that the two supporting rocker arms (154, 156) are carried by said single conveyor.

10. The station according to claim 9, characterized in that the two supporting rocker arms (154, 156) are articulated about the same axis.

11. The station according to claim 2, characterized in that the turning means (24) comprises two supporting rocker arms (48, 60), defining between them a holding space (80) for an article in which the article is retained substantially motionless relative to the two supporting rocker arms (48, 60), the two supporting rocker arms (48, 60) being displaceable substantially simultaneously between a position for removing the article from the transport means (18) and a position for placing the turned article on the transport means (18).

12. The station according to claim 5, characterized in that, in the transfer and turning region (25), the two conveyors (20, 22) are adjacent and move parallel to one another at equal speeds.

13. The station according to claim 3, characterized in that, upstream of the turning means (24), said conveyor comprises means (40) for distributing the articles in positions (45) spaced at a distance determined in accordance with its length, and in that, downstream of the turning means (24), said conveyor comprises support zones (68) for the articles which are spaced at a distance determined in accordance with its length, the turning means (24) being designed to transfer each article from a position (45) on the first conveyor to a support zone (68) of the second conveyor (22).

14. The station according to claim 4, characterized in that, upstream of the turning means (24), one of said conveyors comprises means (40) for distributing the articles in positions (45) spaced at a distance determined in accordance with its length, and in that, downstream of the turning means (24), the other of said conveyors comprises support zones (68) for the articles which are spaced at a distance determined in accordance with its length, the turning means (24) being designed to transfer each article from a position (45) on said one of said conveyors to a support zone (68) of the other of said conveyor (22).

15. The station according to claim 5, characterized in that, upstream of the turning means (24), one of said conveyors comprises means (40) for distributing the articles in positions (45) spaced at a distance determined in accordance with its length, and in that, downstream of the turning means (24), the other of said conveyors comprises support zones (68) for the articles which are spaced at a distance determined in accordance with its length, the turning means (24) being designed to transfer each article from a position (45) on said one of said conveyors to a support zone (68) of the second conveyor (22).

16. The station according to claim 6, characterized in that, upstream of the turning means (24), one of said conveyors comprises means (40) for distributing the articles in positions (45) spaced at a distance determined in accordance with its length, and in that, downstream of the turning means (24), the other of said conveyors comprises support zones (68) for the articles which are spaced at a distance determined in accordance with its length, the turning means (24) being designed to transfer each article from a position (45) on said one of said conveyors to a support zone (68) of the other of said conveyors (22).

* * * * *